May 24, 1960  K. E. HUMBERT, JR  2,937,756
FILTER UNIT

Filed Dec. 29, 1954  2 Sheets-Sheet 1

Inventor
Kingsley E. Humbert, Jr.
By Shoemaker & Mattare
ATTYS.

May 24, 1960  K. E. HUMBERT, JR  2,937,756
FILTER UNIT
Filed Dec. 29, 1954  2 Sheets-Sheet 2

Inventor
Kingsley E. Humbert, Jr.
By Shoemaker & Mattare
ATTYS.

United States Patent Office 2,937,756
Patented May 24, 1960

2,937,756
FILTER UNIT

Kingsley E. Humbert, Jr., Gastonia, N.C., assignor to Wix Corporation, Gastonia, N.C., a corporation of North Carolina Filed Dec. 29, 1954, Ser. No. 478,359

14 Claims. (Cl. 210—444)

This invention relates to improvements in filters, more especially filters for use upon engines of the internal combustion type such as are used in the operation of various forms of motor vehicles such as passenger vehicles, busses, trucks and the like although the invention is not limited to such use.

Filters of the conventional type used upon motor vehicle engines embody either a fixed casing in which a removable filter element is housed or a sealed casing or container in which the filter element is enclosed and which sealed type is fully replaceable. In the first mentioned type the filter element when it has become dirty or clogged so that it is no longer functioning satisfactorily, is renewed by opening the casing, removing the oily clogged element and replacing it with a new element. In this type of filter the disconnection of oil lines is not required but it does require the handling of a dirty, oily element with the possibility of dripping oil on the person or on the motor or car body.

With the second mentioned type in order to renew the filter it becomes necessary to disconnect oil lines from the shell in order to remove the filter and then connect the lines to a new sealed unit. This operation is time consuming and sometimes difficulties arise such as a difficulty of breaking or unscrewing the pipe connections or making a tight leak proof connection with the new filter.

In the light of the foregoing an object of the present invention is, therefore, to avoid or overcome the aforegoing difficulties by providing a new sealed type filter assembly which is adapted to be mounted or placed in operating position by means of a single screw thread coupling whereby the handling of oily filter units is avoided and there is also avoided the necessity of uncoupling and coupling oil lines.

Another object is to provide, in a manner as hereinafter set forth, a new sealed filter assembly embodying an element enclosing shell produced or formed in a novel manner by impact extrusion whereby to produce a cylindrical body open at one end and having an integral nut blank at its other end which, when tapped, provides means for mounting the filter for use.

Still another object of the invention is to provide a new oil filter structure embodying a mounting body or member adapted to be secured to the engine block and having an outflow and a return flow passage, in combination with a sealed unit adapted to be threadably coupled with the mounting body and coacting therewith to effect the flow of unfiltered oil to the outside of the encased filter element whereby it may flow radially inwardly to the center of the element and returned in filtered condition through the said inflow passage.

In conventional oil filter mountings on motor vehicle engines if the filter unit or replacement unit becomes loose by reason of vibration or for any other means, or is inadvertently removed while there is oil pressure in the engine, that is, while the engine is running, no means is provided for preventing the escape of oil. Accordingly a further object of the invention is to provide, in a manner as hereinafter set forth, a readily replaceable sealed filter unit and mounting means therefor which is designed in a novel manner whereby the pressure line from the engine is maintained open so long as the filter structure remains tightly secured in position but will be immediately closed if the filter works loose or is inadvertently removed while there is pressure in the line.

More specifically the invention contemplates the provision, whereby the foregoing objects are attained, of a deep drawn shell or cylinder in which a filter cartridge is located, one end of the cylinder being closed by a solid or imperforate wall while the opposite end embodies a threaded nut by means of which the cylinder structure is secured in operating position upon a threaded mounting stud. Between this nut and the said imperforate end wall the filter element is firmly held, the filter element or cartridge embodying end walls between which is held an elongate annular filter media and the inner end of the said nut is provided with laterally directed or radial fluid passages whereby inflowing unfiltered oil is directed to the outer side of the filtering body. The said mounting stud is provided with an outflow passage which communicates with the radial passages of the nut and is provided with a return flow passage embodying a tube which passes through the adjacent end plate of the filter body into the central portion of the latter, which tube collects or receives the filtered oil and directs it back for reuse in the engine structure.

In addition to the foregoing structure a modified construction embodies an axially movable return flow tube or nozzle carried by the mounting stud with which is associated a valve element which is held open so long as the filter remains firmly in working position but which becomes closed by spring action in the event that the filter structure becomes loose on the stud or is inadvertently removed therefrom, to shut off the outflow of unfiltered oil if, in such a contingency, there is oil pressure in the engine.

The invention will be best understood from a consideration of the following detailed description taken in connection with the accompanying drawings forming a part of the specification, with the understanding that the invention is not confined to a strict conformity with the showing of the drawings but may be changed or modified within limits and within the scope of the appended claims.

Figure 1:
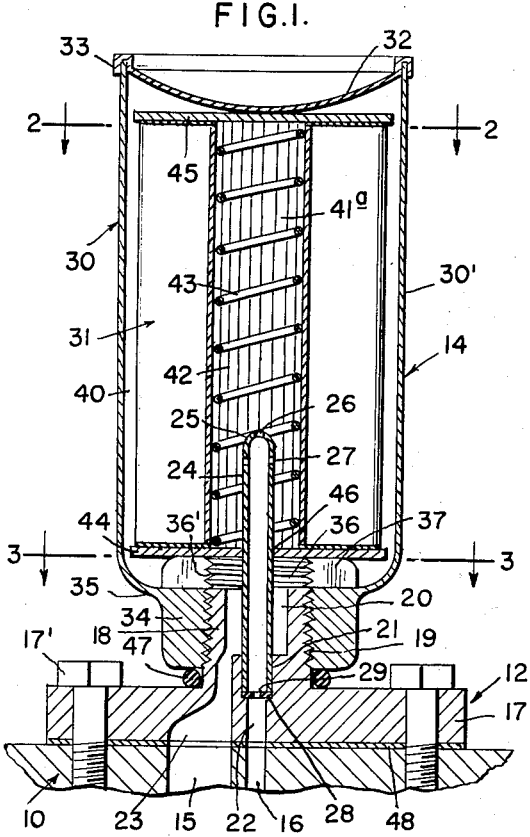
Fig. 1 is a longitudinal sectional view through a filter unit constructed in accordance with the present invention showing the same mounted.

Referring now more particularly to the drawings Fig. 1 illustrates one embodiment of the present invention wherein the numeral 10 designates a portion of an engine block, the numeral 12 designates the mounting base forming a part of the complete assembly and the numeral 14 generally designates the replaceable or renewable filter structure which is detachably connected with the mounting base.

In the engine block the numerals 15 and 16 respectively designate outlet and inlet ports connected with the oil lines, the port 15 carrying outwardly the oil to be filtered and the port 16 receiving the filtered oil and returning it for reuse.

The mounting base 12 in the form here illustrated comprises a plate 17 which is secured in a suitable manner as by means of machine screws 18 or the like, in position upon the engine block and this plate carries as an integral part thereof the outwardly projecting stud 18 which is externally screw threaded as indicated at 19.

The stud 18 has formed therethrough from the outer end thereof, the bore or passage 20 which continues through the plate 17 in the reduced socket portion 21 which in turn leads into the short passage 22 which is of smaller diameter than the socket 21 and which passage aligns with the return flow port 16 when the base is mounted in position for use.

Also formed transversely through the plate 17 at one side of the socket 21 and passage 22 is the flow passage 23 which opens at one end through the side of the mounting plate 17 opposite from the stud 18 and in a position for registry with the outflow port 15 while the other end of this passage joins the bore 20.

The socket 21 has fixed therein, in this embodiment of the mounting base structure, one end of an outflow tube or pipe 24 which communicates with the passage 22 and which extends through the bore 20 for a substantial distance or extent beyond the end of the stud 18 and the outer end of this pipe or tube is slightly tapered as indicated at 25 and has the end inlet opening 26 and one or more side inlet openings or holes 27.

Between the inner end of the tube 24 and the bottom of the socket 21 is a flow resitrictor in the form of a disc 28 having the small aperture 29 therethrough. This restrictor functions to control the amount of oil which may flow through the filter cartridge.

The replaceable or renewable cartridge comprises a shell, generally designated 30 in which is housed or enclosed the filter element which is generally designated 31.

The shell 30 is not only of a new and novel form but is produced in a novel manner as hereinafter described. This shell comprises the long cylindrical wall portion 30' and is closed at its outer end by the end wall 32 which is here illustrated as being inwardly bowed or inwardly convex and is secured at its periphery by a fluid tight or leak proof sealed joint 33 to the outer end edge of the cylindrical wall as illustrated.

The inner or mounting end of the shell comprises a nut body 34, the overall diameter of which is less than the diameter of the cylindrical wall of the shell and a portion of this nut body extends into the area defined by the cylindrical wall while the major portion of the nut body forms a longitudinal extension of the wall as illustrated. Thus the inner end of the cylindrical wall is constricted, being here shown as curving inwardly toward and is joined to the outer side of the nut body 34 as indicated at 35 and, as illustrated, the nut body and the cylindrical wall are of unitary construction, that is, they are, in the preferred embodiment of the invention, shaped or produced from a single piece of metal.

The wall 30' and the nut body 34 are formed from the selected material by impact extrusion so that the nut or inner end of the shell and the wall are solid or in one continuous piece and in this forming operation an axial passage 36 may be formed through the nut body which is of proper diameter after being subsequently tapped to form the screw threads 36', to threadably receive the stud 18 to effect the mounting of the shell in working position.

Alternatively the nut may be formed as a solid structure and later drilled and tapped if desired.

Figure 8:
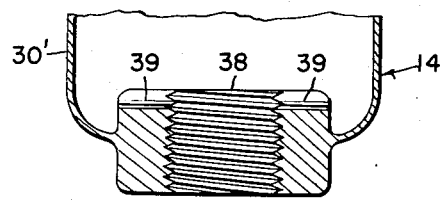
Fig. 8 is a detail section illustrating a modified form of the radial passages in the inner end of the mounting nut.

The inner end portion of the nut 34, which lies within the cylindrical wall is provided with a series of laterally directed openings or passages, such passages being here designated 37 and being in the form of radial channels whereby a castellated nut form or construction is produced. These channels may be produced by the extrusion die as the material for forming the wall and nut is shaped or the passages may be formed in any other suitable manner if they are not produced simultaneously with the extrusion operation. Also in place of the deep channels 37 here illustrated the inner end face 38 of the nut body may be provided with shallow transverse channels 39 or any other form of radial flow passages may be produced as may be desired or found most convenient. See Fig. 8.

The filter media generally designated 31 may be of any acceptable filtering material but is here illustrated as comprising a pleated paper tube or annulus having an overall or outside diameter slightly less than the inside diameter of the cylindrical wall of the shell in which the filter media is housed. Thus, as illustrated, when the filter media is in position there will be provided a flow space 40 around the same between the outer portions of the folds 41 and the wall.

Supporting the filter media and extending through the center thereof in the passage 42 is a spiral spring 43 which bears against the inner edges 41a of the folds 41. In place of this spring here illustrated use may also be made of a perforated metal tube which will support the filter material and permit the oil to flow therethrough into the center passage 42.

The filter material is interposed between and firmly attached to the inner and outer end plates 44 and 45 respectively. The outer end plate 45 is imperforate and where the end wall 32 of the shell is inwardly curved or convex it bears against this end plate as illustrated and the inner plate 44, which has a central passage or opening 46 therethrough, rests upon the inner end of the nut body 34 which forms a seat therefor, so that the filter material is firmly held within and concentric with the cylinder between the nut and the wall 32.

While the wall 32 has been illustrated and described as inwardly curved this form is not essential as it may be flat or convex as desired.

The opening 46 through the inner plate 44 constitutes a flow passage through which the tube 24 extends when the filter structure is mounted in operative position on the mounting stud 18 and the diameter of the opening 46 is such as to snugly receive the tube so that leakage of fluid through the opening around the tube is prevented.

From the foregoing it will be apparent that the entire novel and improved filter assembly comprises the mounting base 12 and the replaceable filter structure 14 while the structure 14 comprises as a unit the shell which includes the wall 31, the end wall 32 and the nut 34 together with the filter media 31 which is firmly held therein between the nut and the outer end wall 32. Thus after the mounting plate 12 has been secured to the engine block it remains in this position and renewal of the filter assists in removing the structure 14 which has been threadably mounted upon the nut 18 and replacing it with a new structure by the simple operation of screwing the nut body 31 onto the mounting stud 18.

In order to insure a leak proof coupling between the nut and stud, an annular gasket 47 may be placed around the base of the stud against which the outer end of the nut body 34 presses when the filter structure is threaded thereon. Also a suitable gasket 48 may be interposed between the engine block wall and the mounting base as illustrated.

When the filter is mounted for use the unfiltered oil will flow through the passages 15 and 23 into the nut passage 35 and then laterally through the passages 37 to the outer side of the filter media 31, passing then radially inwardly into the passage 42 to return by way of the outflow tube 24, the passage 22 and port 16.

Figure 4:
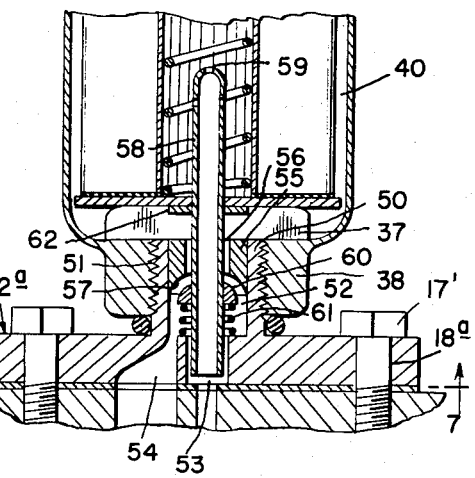
Fig. 4 is a sectional detail through the lower portion of a filter cartridge showing a modified embodiment of the mounting means incorporating a shut-off valve.
Figure 3:
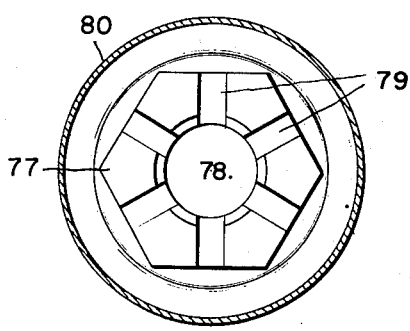
Fig. 3 is a transverse section taken substantially on the line 3—3 of Fig. 1.
Figure 7:
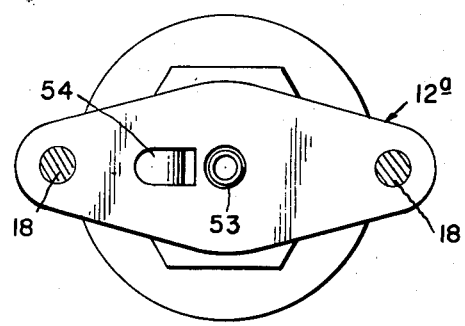
Fig. 7 is a sectional view taken substantially on the line 7—7 of Fig. 4.

Fig. 4 shows a modified embodiment of the mounting base 12 wherein provision is made to prevent the loss of oil in the event that the filter replacement cartridge shakes loose or is inadvertently removed while there is oil pressure in the engine, that is, while the engine is running.

In this second form of the mounting base the plate which is bolted to the engine block is designated 12a and is of elongate form and provided adjacent to each end with an opening 18a for the mounting machine screw 18.

The stud forming an integral part of the plate 12a is designated 50 and carries the external screw threads 51 to facilitate the attachment of the cartridge thereto. This stud has a bore 52 formed through the length thereof from the outer end to the adjacent face of the plate 12a to which it is attached or of which it forms a part as shown. This bore is continued through the plate 12a by the passage 53 which is of materially less diameter than the bore 52 and which corresponds to the passage 22 in the plate 12 and at one side of the passage 53 is the unfiltered oil outlet or outflow passage 54 which corresponds to the passage 23 previously referred to and which opens into the bore 52 at one side thereof.

Disposed in the outer end portion of the bore 52 is a valve insert 55 in the form of a tube having the axial passage 56 therethrough and the inner end of this insert is recessed or of substantially concave form to provide a valve element seat 57.

The filtered oil outflow pipe or tube in this modified construction is designated 58 and is constricted or tapered at its outer end to the proper degree to provide the small restrictor passage or opening 59.

The opposite end portion of the tube 58 extends through the bore 56 of the insert 55, through the inner end portion of the mounting stud bore 52 and into the passage 53 as shown and the outside diameter of the tube is such as to fit relatively snugly in the passage 53 but not sufficient to restrict or interfere with its free sliding movement in the passage.

Encircling the tube 58 and disposed within the inner end portion of the mounting stud bore 52 is the valve element 60. The overall diameter of this element is slightly less than the diameter of the bore 52 so that room is provided for the free flow of oil past the same and into and through the bore 56, the diameter of which is somewhat greater than the outside diameter of the tube as shown. The valve element 60 is fixed or secured to the tube and interposed between the element and the bottom of the bore 52 is an expansion spring 61 in the form of a coil encircling the tube and bearing at one end against the rear side of the valve element and at the other end against the bottom of the bore. The spring constantly urges movement of the tube 58 and the valve element in a direction to press the valve element against the seat 57, the face of the valve element opposing the seat being of the proper curvature to correspond with the curvature of the seat so as to have tight contact therewith.

At the outer end of the insert 55 the tube 58 is encircled by and has secured thereto a collar 62 or other suitable element for engagement by the centrally apertured plate 44 forming a part of the filter media.

It will be seen from the foregoing that when the filter cartridge is detached from the threaded stud 51 the spring 61 will force the tube 58 outwardly to seat the valve element and thus close the outflow passages 54, 52 and 56. When the filter cartridge is mounted on the stud the tube 58 will pass through the aperture in the plate 44 and the plate will be brought to bear upon the disc 62 or other element carried by the tube 58 and effect the axial movement of the tube inwardly so as to remove the valve element 60 from its seat and at the same time place the spring 61 under compression. The oil may then circulate freely through the filter material and pass back to the engine by way of the tube 58 as will be readily apparent.

In the foregoing description of the mounting bases and in the illustration of the same, the bases have been shown and described as including a plate which is bolted to the engine block. Instead of the plate mounting there may be provided a mounting of the type illustrated in Fig. 5 wherein there is provided a threaded stud which may be screwed into a correspondingly threaded opening in the engine block. In this construction the numeral 12b designates a plate of octagonal contour corresponding to the previously described 12 and 12a. Extending from one side of this plate is the mounting stud 63 which is externally screw threaded as indicated at 64 to receive the threaded nut 34 of the filter cartridge. In this machined mounting a spring pressed shut off valve is shown which corresponds to the valve structure hereinbefore described in connection with the embodiment illustrated in Fig. 4 but it is to be understood that this mounting stud 63 may be of the same character as the stud 18, if desired, where the outflow tube is fixed against axial movement and no shut off means is provided.

Figure 5:
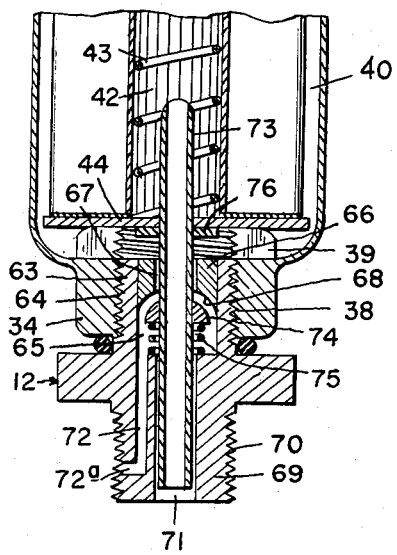
Fig. 5 is a sectional view illustrating a modified form of the mounting base wherein a threaded stud is provided for securing the base to the engine block.
Figure 2:
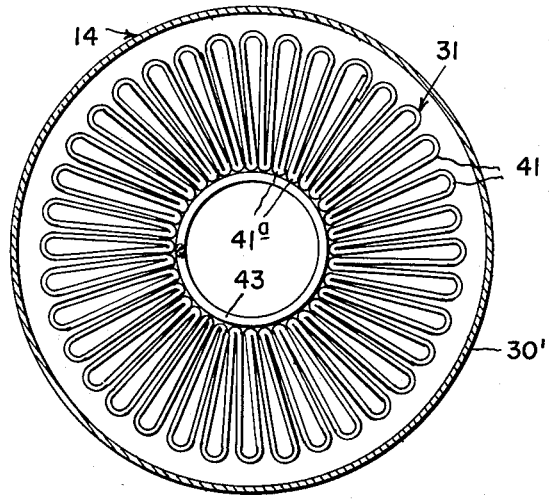
Fig. 2 is a transverse section taken substantially on the line 2—2 of Fig. 1.
Figure 6:
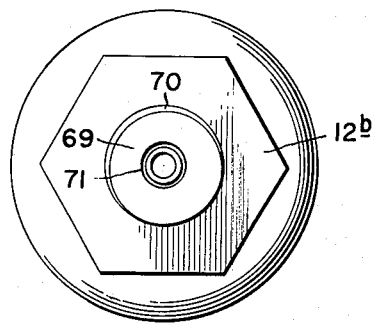
Fig. 6 is a view looking toward the inner end of the mounting base shown in Fig. 5.

In the structure of Fig. 5 the stud 63 has the bore 65 therethrough in which is fitted in the outer end portion thereof the valve seat insert 66 in the form of a sleeve, having an axial bore 67 therethrough and formed at its inner end to provide the curved seat 68.

On the opposite side of the plate 12b there is formed the stud 69 which is externally threaded as indicated at 70 for engagement in a threaded opening in an engine block and through this stud is formed the axial bore or passage 71 which extends through the plate 12b and into the inner end of the bore 65.

In addition to the passage 71 the engine block engaging stud 69 has the longitudinally extending eccentrically positioned passage 72 formed therein which passes through a plate 12b and also enters the bore 65 at the outer end while the inner end joins the lateral or radial inlet passage 72a.

The numeral 73 designates the outflow tube which in this construction is somewhat longer than the tube 58 in that it extends through the bore 67 of the valve seat insert, the bore 65 and into and through the major portion of the length of the passage or bore 71. The tube carries, within the mounting stud bore 65, the valve element 74 which is adapted to rest on the seat 68 when the tube 73 is forced outwardly by the spring 75 at such time when the filter cartridge is removed from the stud 63 or is loosened to any considerable extent thereon.

At the outer end of the valve seat insert the tube carries the disc 76 or any other suitable means which when the filter cartridge is threaded to position on the stud will be engaged by the apertured end plate 44 so as to effect the inward movement of the tube and the unseating of the valve.

Figure 9:
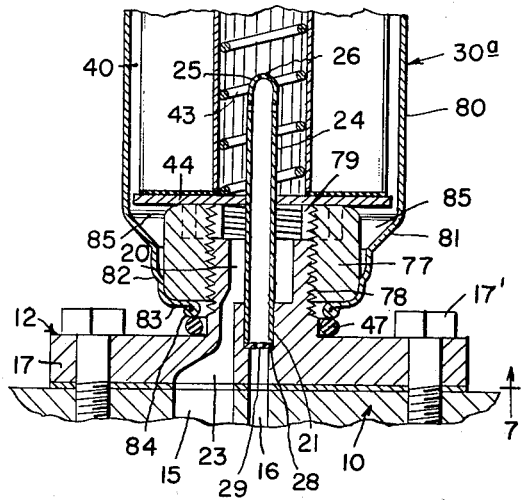
Fig. 9 is a sectional view illustrating another manner of forming the mounting nut and inner end of the filter material encasing shell.

While the preferred manner of forming the cylindrical wall and mounting nut for the shell is by impact extrusion as previously described so that the mounting nut and the cylindrical wall are pressed or shaped from a single piece of material the construction illustrated in Fig. 9, may also be employed. In this alternative construction use is made of a conventional nut 77 of suitable size having the threaded passage or bore 78 therethrough and such nut may be of the castellated type wherein it is provided with a number of end slots 79 as shown.

The filter material encasing shell is generally designated 30a and the cylindrical wall thereof, designated 80 has the nut 77 positioned in one end thereof with the slots 79 directed inwardly. The end of the shell is shaped in a suitable manner, as by turning, extruding or spinning down to taper inwardly as indicated at 81 to the wall of the nut which it contacts approximately midway between its ends and the material is then disposed in tight contact with the outer wall of the nut and entirely around the same as indicated at 82 to form a fluid tight connection therewith. The material may be further carried under or part way across the outer end of the nut as indicated at 83 and terminated in the rolled annulus or rib 84 which, when the filter is threaded upon one of the hereinbefore mounting studs, will press against the sealing ring 47 in the manner in which the nut 34 is shown in Fig. 1.

As shown, by bringing the cylinder wall in against and around the nut at approximately the central part between the inner and outer ends the closing of the slots 79 is avoided thereby leaving ample space at 85 below the plate 44 of the filter media for the passage of oil outwardly to the sides of the latter.

While there has been illustrated and described a castellated type of nut it is to be understood that the flow of oil laterally into the shell may be effected by employing any other type of nut wherein suitable passages have been provided as for example drilled passages formed radially through the nut or the like.

From the foregoing it will be seen that there is provided by the present invention a new and novel screw-on type of filter and mounting assembly which permits of the rapid and easy changing of filters without having to bother with uncoupling and coupling oil lines and without having to handle oily, dirty filter elements. Also there is provided by the present invention the new and novel means for preventing the escape of oil from the fluid line if the filter becomes loosened for any reason or is inadvertently removed while there is pressure in the line.

I claim:

1. A filter assembly comprising a mounting base including a plate having a threaded stud integral with one side thereof, the stud having a bore extending from the free end inwardly toward the plate, the inner end of said bore having a socket connecting therewith and leading to a passage having an end opening at the other side of the plate, a second passage through the plate parallel to and common with the bore through part of its length, a tube of smaller outside diameter than the bore and having one end fixed in said socket and extending therefrom through the bore and extending a substantial distance beyond the free end of the stud, a sealed filter unit comprising a shell and a filter element therein, means carried by an end of the shell for threadably coupling said shell with said stud, and means forming a part of said coupling means whereby fluid entering the shell through the second passage will be directed radially in the shell for passage through said filter body to and through said tube and out of the filter body and shell by way of the first passage.

2. The invention according to claim 1, wherein said filter element comprises end plates spaced longitudinally of the shell with filter material therebetween, one of said end plates having an aperture through which said tube extends in a fluid tight fit into the filter body.

3. The invention according to claim 1, wherein said filter element comprises filter material in the form of an elongate transversely annular structure, an imperforate plate secured to and closing the end of the structure remote from the base and a centrally apertured plate secured to the other end of the structure, said apertured plate resting against the said means for threadably coupling the shell to the stud, said tube fitting snugly in the aperture of said aperture plate and extending into the annular structure.

4. A filter assembly comprising a mounting base embodying a plate and an attached threaded stud, the stud having a bore opening through the free end thereof and a pair of passages communicating with the bore and opening through the plate, an elongate tube having one end portion extending through the bore and slidably received in one passage, the other end of the tube projecting a substantial distance beyond said free end of the stud, means in the stud bore adjacent said free end forming an annular valve seat around the tube, a valve element carried by and surrounding the tube and adapted to position on the seat when the tube is moved toward the free end of the stud, means yieldingly urging the movement of the tube in a direction to seat said element, a sealed filter unit comprising an elongate shell and a filter body therein, said shell being closed at one end by a wall, the other end of the shell being closed by a threaded nut body adapted for threaded connection with said stud, the filter body including an elongate annular structure of filter material and a centrally apertured plate at one end seated against the inner end of said nut, said tube having its other end extended through the aperture of said plate when the nut body is threaded onto the stud, means whereby fluid flowing into the shell past the open valve may pass between the nut and said plate to the outer side of the filter body, and means forming a coupling between the apertured plate and tube whereby to shift the tube in a direction to unseat said valve element when the nut body is fully threaded into the stud.

5. A filter construction comprising a cylinder body, a nut at one end of the cylinder body and forming a fixed part thereof, the cylinder body at said end being joined to the nut by a constricted nut body encircling portion, said constricted encircling portion joining the nut body between the ends thereof whereby a portion of the nut body lies within the cylinder, a closure member secured to the other end of the cylinder, a unitary filter element within the cylinder and including end plates having a longitudinal pleated filter body therebetween, one of said end plates being positioned against and supported by the inner end of said nut body and the other end plate being engaged by said closure and pressed thereby on the nut body, and fluid channels in said inner end portion of the nut body and each opening at one end radially through the side of the nut body and at the other end opening into said bore and said channels being covered by said one of the end plates.

6. A filter assembly comprising a mounting base including a plate, a threaded stud integral with and terminating at one side thereof, a pair of fluid passages leading through the plate and extending longitudinally through the stud, means in the form of a tube connected with and extending from one of said fluid passages a substantial distance beyond the free end of the stud, the other fluid passage terminating at and opening through the free end of the stud, a filter unit comprising a shell and a filter element therein, a coupling body integral with one end of the shell and having a threaded bore extending axially entirely therethrough for receiving and coupling the shell with said stud, the threaded coupling body having a portion extending into the shell and having an inner end surface forming a seat for the end of the filter element, a closure for the other end of the shell extending inwardly and engaging the other end of the filter element and pressing the said one end of the element against said seat, the other end of the filter element having an opening leading into the element and formed to snugly receive the other end of said tube, said other end of the tube terminating within the filter element and the said portion of the coupling body which extends into the shell having a radial fluid passage leading into the bore from the shell below the said one end of the filter element to pass fluid from the shell to the bore of the coupling body and to the said other fluid passage of the stud.

7. The invention according to claim 6, wherein said radial fluid passage comprises an open channel across the inner end surface of the coupling body and covered to form a passage by the said one end of the filter element.

8. A filter assembly comprising in combination a mounting base embodying a plate having at least two mounting bolt receiving apertures for facilitating securing the plate with one side against a supporting body, the other side of the plate between said apertures being in one piece with a short externally threaded stud, said stud having a bore with a portion of one diameter extending axially from the free end of the stud inwardly and terminating short of the inner end of the stud and then continuing in a portion of smaller diameter to and opening through said one side of the plate, a flow passage extending through the plate from said one side thereof along the side of said smaller diameter portion and joining the inner end of said portion of one diameter, a tube of greater length than the stud and supported at one end coaxial with and at the inner end of said bore portion of one diameter and communicating at said one end with the bore portion of smaller diameter, said tube extending at its other end a substantial distance beyond the free end of the stud, a sealed filter unit comprising a shell and a filter element therein, means carried by an end of the shell for threadably coupling said shell with said stud and means forming a part of said coupling means whereby fluid entering the shell through the second passage will be directed radially in the shell to flow through said filter body to and through said tube and out of the filter body and shell by way of the first passage.

9. A mounting base for a filter of a type having a coupling neck, said base comprising a flat body, means for attaching said flat body to a support body having fluid outlet and inlet ports, a stud formed integral with and terminating at one side of the flat body and adapted for securement in the filter coupling neck, the opposite side of the flat body being adapted for application to a flat supporting surface of the support body, the stud having a bore opening through the outer end thereof, a passage leading from the bottom of the bore through the inner end of the stud and the flat body, a second passage through the stud and flat body parallel with the bore and the first passage and common with the bore at one end, and a tube open at both ends and operatively coupled to and supported by the flat body and having one end in the first passage and extending through the bore and projecting a substantial distance beyond the free end of the stud for entrance into a filter secured on the stud.

10. The invention according to claim 9, with valve means controlling the flow of fluid through the outside of said tube, and means for effecting actuation of the valve means to open position upon the securing of the stud in the coupling neck of a filter.

11. A filter assembly comprising a mounting base including a body having a filter attaching stud integral with one side thereof, means for attaching said mounting base body to a supporting body having a fluid outlet port and a fluid inlet port, the stud having a bore opening through the outer end thereof, a first passage leading from the bottom of the bore through the inner end of the stud and the plate, a second passage in the stud and plate parallel with the bore and with the first passage and having one end common with the bore, a tube open at both ends and operatively coupled to and supported by the said mounting base body and having one end in the first passage and extending through the bore and projecting a substantial distance beyond the free end of the stud, a sealed filter unit comprising a shell and a filter element therein, means carried by an end of the shell for coupling the shell with said stud, the filter element being formed with an aperture for snugly receiving the said projecting end of said tube, and means forming a part of said coupling means whereby fluid entering the shell by way of the second passage and the bore will be directed radially in the shell for passage through said filter body to and through said tube and out of the filter body and shell by way of the first passage.

12. The invention according to claim 11, wherein said tube has sliding movement in the first passage, an annular valve seat element in said bore around the tube and spaced therefrom, said element being formed to provide a valve seat directed toward the inner end of the bore, a valve element around and secured to the tube and adapted to engage on said seat, and resilient means urging movement of the tube and valve element in a direction to engage the element on the seat.

13. The invention according to claim 11, with a valve means controlling the flow of fluid through the bore on the outer side of the tube, and means actuated by a part of the filter unit for effecting the actuation of the valve means to open position upon the operative coupling of the filter unit with the stud.

14. The invention according to claim 11, wherein said operative coupling of the tube to and its support by mounting base body comprises a spring encircling the tube in a part of the bore, means forming a rest for one end of the spring, a valve element secured to and encircling the tube and having the other end of said spring bearing thereagainst, the tube being axially movable and the spring urging movement of the tube to valve closed position, a seat for the valve in the bore around the tube, the valve when seated shutting off flow of fluid through the bore along the outer side of the tube, and cooperating means carried by the tube and the filter unit for effecting unseating of the valve upon the operative coupling of the filter unit with the stud.

References Cited in the file of this patent

UNITED STATES PATENTS

| | | |
|---|---|---|
| 781,018 | Palmer | Jan. 31, 1905 |
| 1,872,430 | Ericson | Aug. 16, 1932 |
| 2,114,485 | Frolander | Apr. 19, 1938 |
| 2,165,826 | Werder | July 11, 1939 |
| 2,185,281 | Tear | Jan. 2, 1940 |
| 2,203,668 | Burckhalter | June 11, 1940 |
| 2,381,141 | Russell | Aug. 7, 1945 |
| 2,535,760 | Sherman et al. | Dec. 26, 1950 |
| 2,544,244 | Vokes | Mar. 6, 1951 |
| 2,591,248 | Francois | Apr. 1, 1952 |
| 2,633,991 | Beatty | Apr. 7, 1953 |
| 2,636,610 | Bickle | Apr. 28, 1953 |
| 2,642,187 | Bell | June 16, 1953 |
| 2,671,564 | Fricke | Mar. 9, 1954 |
| 2,675,127 | Layte | Apr. 13, 1954 |

FOREIGN PATENTS

| | | |
|---|---|---|
| 528,696 | France | Aug. 23, 1921 |